US008438569B2

(12) United States Patent
Day et al.

(10) Patent No.: US 8,438,569 B2
(45) Date of Patent: May 7, 2013

(54) BROADCASTING A CONDITION TO THREADS EXECUTING ON A PLURALITY OF ON-CHIP PROCESSORS

(75) Inventors: Michael Norman Day, Round Rock, TX (US); Mark Richard Nutter, Austin, TX (US); Daniel Lawrence Stasiak, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1918 days.

(21) Appl. No.: 10/965,634

(22) Filed: Oct. 14, 2004

(65) Prior Publication Data

US 2006/0085791 A1  Apr. 20, 2006

(51) Int. Cl.
*G06F 9/46* (2006.01)
*G06F 1/26* (2006.01)
*G06F 9/44* (2006.01)

(52) U.S. Cl.
USPC ............................ 718/101; 713/320; 719/318

(58) Field of Classification Search ................... 718/100; 709/220–221; 714/14, 26
See application file for complete search history.

(56) References Cited

U.S. PATENT DOCUMENTS

| | | | | |
|---|---|---|---|---|
| 5,283,868 A * | 2/1994 | Baker et al. | | 709/227 |
| 5,293,620 A * | 3/1994 | Barabash et al. | | 718/102 |
| 5,515,521 A * | 5/1996 | Whitted et al. | | 711/3 |
| 5,727,203 A * | 3/1998 | Hapner et al. | | 707/103 R |
| 5,946,716 A * | 8/1999 | Karp et al. | | 711/207 |
| 6,370,622 B1 * | 4/2002 | Chiou et al. | | 711/146 |
| 6,601,176 B1 * | 7/2003 | Alexander et al. | | 713/300 |
| 7,228,385 B2 * | 6/2007 | Guthrie et al. | | 711/118 |
| 2003/0188041 A1 * | 10/2003 | Fillmore | | 709/318 |

\* cited by examiner

*Primary Examiner* — Camquy Truong
(74) *Attorney, Agent, or Firm* — Matthew B. Talpis; Gregory K. Goshorn; Greg Goshorn, P.C.

(57) ABSTRACT

The present invention provides for notifying threads. A determination is made whether there is a condition for which a thread is to be notified. If so, a notification indicia is broadcasted. A flag is set in at least one memory storage area as a function of the notification indicia wherein the setting the flag occurs without the intervention of an operating system. Therefore, latencies for notification of threads are minimized.

12 Claims, 2 Drawing Sheets

BROADCASTING A CONDITION TO THREADS EXECUTING ON A PLURALITY OF ON-CHIP PROCESSORS

RELATED APPLICATION

The U.S. patent application Ser. No. 10/725,129, filed on Dec. 1, 2003, entitled "Method and Apparatus for Efficient Multi-Tasking", inventors Michael Day, Takeshi Yamazaki, and Thuong Truong, is hereby incorporated by reference in its entirety.

TECHNICAL FIELD

The present invention relates generally to multiprocessor systems and, more particularly, to notifying execution threads of events.

BACKGROUND

Real-time, multimedia, applications are becoming increasingly important. These applications require extremely fast processing speeds, such as many thousands of megabits of data per second. While single processing units are capable of fast processing speeds, they cannot generally match the processing speeds of multi-processor architectures. Indeed, in multi-processor systems, a plurality of processors can operate in parallel (or at least in concert) to achieve desired processing results.

The types of computers and computing devices that may employ multi-processing techniques are extensive. In addition to personal computers (PCs) and servers, these computing devices include cellular telephones, mobile computers, personal digital assistants (PDAs), set top boxes, digital televisions and many others.

A design concern in a multi-processor system is how to manage the use of a shared memory among a plurality of processing units. Indeed, synchronization of the processing result, which may require multi-extension operations. For example, proper synchronization may be achieved utilizing so-called atomic read sequences, atomic modify sequences, and/or atomic write sequences.

A further concern in such multi-processor systems is managing the heat created by the plurality of processors, particularly when they are utilized in a small package, such as a hand-held device or the like. While mechanical heat management techniques may be employed, they are not entirely satisfactory because they add recurring material and labor costs to the final product. Mechanical heat management techniques also might not provide sufficient cooling.

Another concern in multi-processor systems is the efficient use of available battery power, particularly when multiple processors are used in portable devices, such as lap-top computers, hand held devices and the like. Indeed, the more processors that are employed in a given system, the more power will be drawn from the power source. Generally, the amount of power drawn by a given processor is a function of the number of instructions being executed by the processor and the clock frequency at which the processor operates.

In conventional multiprocessor systems, threads run on different processors. Generally, a thread can be described as either a program counter, a register file, and a stack frame. Taken together, these elements are typically referred to as a thread's "context". These threads are useful for instance, in game programming, and can be used for many different tasks in concurrent processing.

However, there is a problem with conventional use of threads in a multiprocessor system. This problem concerns the notification of a first thread on a processor that an outside event or another thread has information that is of interest to the first thread.

This problem has several aspects. First, in conventional technologies, software is used to notify the thread that an event of interest has occurred. This can mean that both the software application and the operating system are involved, which increases latency of notification for a particular processor. Low latency solutions, when available, typically involve active polling for the event by certain threads, causing increased system load and power consumption. Finally, if two or more threads have to be notified of an event substantially concurrently, such that the threads can process the event in concordance with one another, then significant overhead can be involved in event delivery and thread scheduling. This added complexity can negatively impact response time of the threads in a real-time system.

Therefore, there is a need for a system and/or method for notifying threads of an event of interest on disparate processors of a multiprocessor system that addresses at least some of the concerns of conventional notifications of threads on separate processors.

SUMMARY OF THE INVENTION

The present invention provides for notifying threads. A determination is made whether there is a condition for which a thread is to be notified. If so, a notification indicia is broadcasted. A flag is set in at least one memory storage area as a function of the notification indicia wherein the setting the flag occurs without the intervention of an operating system.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
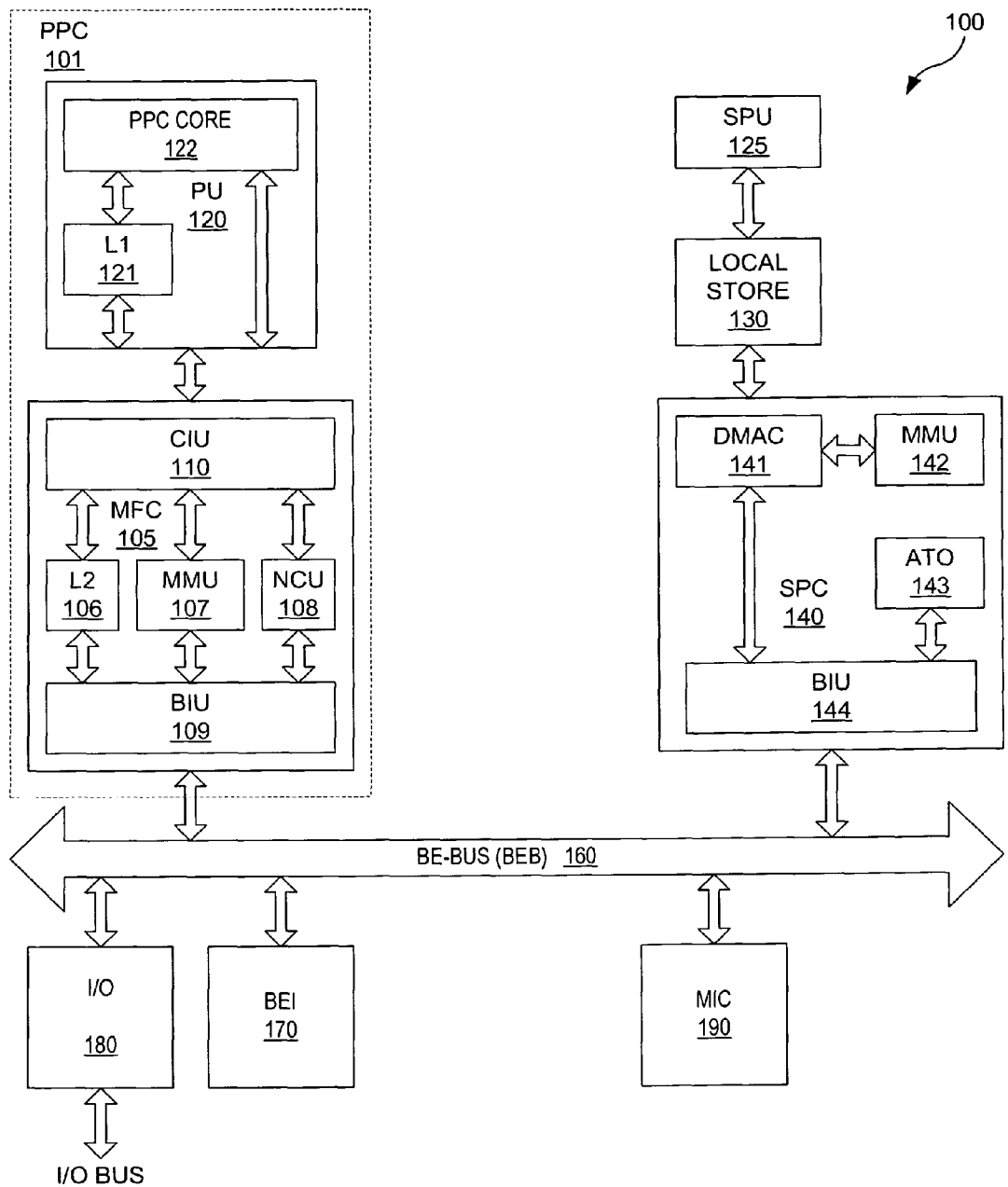
FIG. 1 schematically depicts a multiprocessor system within which a plurality of threads can be executed.

Turning now to FIG. 1, disclosed is a system 100 in notification of threads upon individual processors through the interaction of hardware can operate. Generally, the system 100 uses a hardware notification system for the caches as to which thread has relevant information to a given element, such as L1 121, instead of a employing a software notification system.

In the system 100, a processor, such as a power processor (PPC) 101, becomes aware of an event that is of concern to a thread running on an attached processor unit, such as a special processing unit (SPU) 125. Therefore, the PPC issues a store to a cacheable memory location. This, in turn, generates a cache event that is broadcast by hardware over the broad-band engine bus (BEB) 160 to all of the coupled processors with a registered interest in this memory location. The broadcast command contains an indicia of notification, such as a flag, pertaining to certain threads that an event of interest has occurred.

This flag is placed in the cache of the attached MPUs, or in the local store 130 of the SPU 125, as appropriate, if the processor is one of the processors tagged within the broadcast. A thread executing on an SPU can "block in" a low power state waiting for this cache event. Alternatively, the thread can periodically check the cache or local store to determine whether the event of interest is set.

Alternatively, the processor, such as the SPU 125, can receive notification from the L2 106 when an event of interest to the corresponding thread is set. If so, the thread takes the appropriate action. In a further aspect of the system 100, the SPUs 125 may use power control mechanisms to ramp down power consumption while the event of interest to the corresponding thread is not set, and to further ramp up power consumption on the SPUs 125 when the event is received. In this way power consumption on the SPUs 125 can be minimized, particularly during long periods of inactivity.

Typically, each element can have at least one sub-element. For instance, the MFC 105 has a L2 cache 106, a memory management unit (MMU) 107, a non-cacheable unit (NCU) 108 a bus interface unit 109, and a microprocessor interface unit (CIU) 110. The PU 120 has a PPC core 122 and a L1 cache 121. Likewise, the SPC 140 has a direct memory access controller (DMAC) 141, a memory management unit (MMU) 142, an atomic memory unit (ATO) 143 and a bus interface unit (BIU) 144. The MFC 105, and the cache 140 are coupled to a broad-band engine bus 160. The BEB 160 is also coupled to a I/O bus 180, a broad-band interface (BEI) 170, and a memory interface controller (MIC) 190. There is a memory flow controller (MFC) 105 coupled to a processor unit 120, an SPU 125 coupled to a local store 130, and a synergistic processor (SPC) 140. The MFC 105 and the PU 120 comprise a PPC 101.

In the system 100, the PPC 101 broadcasts over the BEB 160 indicia that one or more threads should be made aware of of on the various processors. The SPU 125, coupled to the local store 130, has placed within it by the SPC 140, indicia of an external event that is of interest to the particular thread running on the SPU 125. The SPU 125 can either then be notified of this flag by the SPC 140, or alternatively, the SPU 125 can periodically check the local store 130 for indicia that there is an event of interest. In a further embodiment, the SPU 125 can place itself in various power consumption or activity states as a function of the received indicia.

Figure 2:
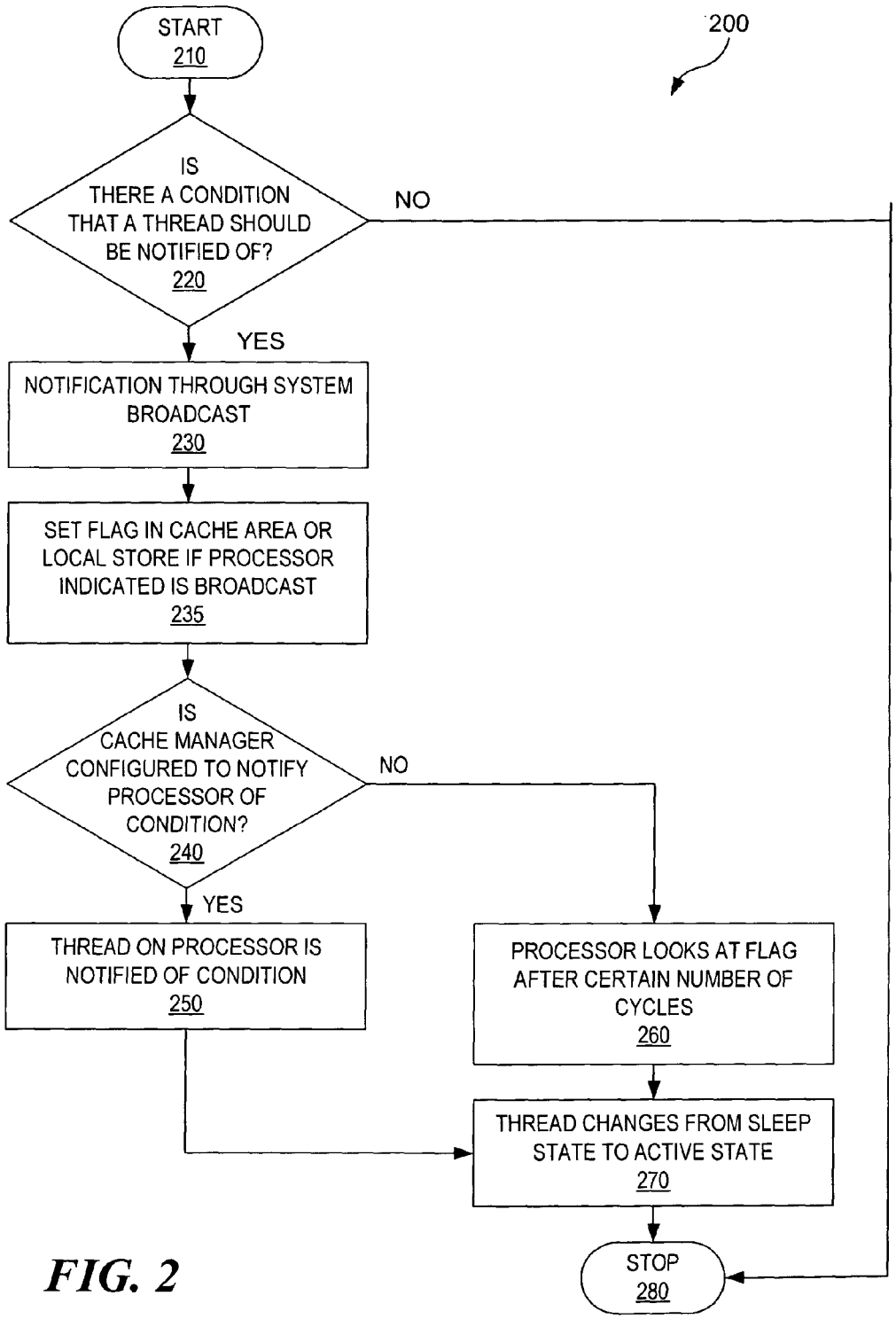
FIG. 2 illustrates a method for notifying threads of execution conditions.

Turning now to FIG. 2, illustrated is a method 200 for notifying a thread on a processor in a multiprocessor environment that an event of interest has occurred using hardware. After a start step 210, the PPC 101 determines if there is a condition that a thread in the multiprocessor system should be notified of. If there is not, step 220 re-executes. If there is, then in step 230 notification that a thread is to be notified is broadcast throughout the system, along with indicia of the thread or threads that are to be motivated. The event would be detected by the L2 and thus broadcast across the BEB to processors with interest in the event. In step 235, the flag is set in the local store if the processor, associated with the thread to be notified, is indicated within the broadcast.

The method 200 then determines in step 240 if the cache manager (or local store manage) is configured to notify the processor of the flag condition. If the cache manager is configured to make the notification, then the thread is notified of the condition by the cache manager in step 250. If the cache manager (or local store manager) is not configured to notify the processor, the thread or processor looks at the flag after a set number of cycles in step 260. In any event, after notification, in some aspects of the present invention, the thread changes in step 270 from a sleep state to an active state after notification, following which the method 200 stops in a stop step 280.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:
1. A method of notifying threads, comprising:
determining whether there is a condition for which a plurality of threads are to be notified;
if so, broadcasting a notification indicia, wherein the broadcasting further comprises broadcasting to a plurality of processors, each processor corresponding to a thread of the plurality of threads;
setting, in response to the notification indicia, a flag in at least one memory storage area in each of the plurality of processors wherein the setting the flag occurs without the intervention of an operating system;

wherein if a cache manager is not configured to notify processor of the received notification indicia, the processor determining whether flag indicia is stored within cache manager after a selected number of cycles.

2. The method of claim 1, further comprising determining whether the cache manager is configured to notify a processor of the plurality of processors of the received notification indicia.

3. The method of claim 2, wherein if the cache manager is configured to notify the processor of the received notification indicia, notifying the thread on the processor by the cache manager.

4. The method of claim 2, further comprising altering a status of the processor from a sleep state to an active state.

5. The method of claim 1, wherein the broadcast is received by the plurality of processors within a latency time window of the system bus.

6. The method of claim 1, further comprising setting flag in a given memory storage area as a function of the notification indicia if an associated processor is indicated in the broadcast.

7. The method of claim 1, further comprising setting a flag in at least one memory storage area as a function of the notification indicia wherein the setting the flag occurs without the intervention of a hypervisor.

8. A system to notify threads, comprising:
   a determining processing unit for determining whether there is a condition for which a thread of a plurality of threads, wherein each thread of the plurality of threads corresponds to a processor of a plurality of processors, to be notified;
   a broadcasting processing unit for broadcasting a notification indicia based on the determination of whether there is a condition for which the thread is to be notified;
   a setting processing unit for setting, in response to the notification indicia, a flag in at least one memory storage area corresponding to the processor wherein the setting the flag occurs without the intervention of an operating system;
   wherein if a cache manager is not configured to notify processor of the received notification indicia, the processor determining whether flag indicia is stored within cache manager after a selected number of cycles.

9. The system of claim 8, further comprising means for determining whether the cache manager is configured to notify the processor of the received notification indicia.

10. The system of claim 9, wherein if the cache manager is configured to notify the processor of the received notification indicia, notifying the thread on the processor by the cache manager.

11. A computer program product for notifying threads in a computer system, the computer program product having memory with a computer program embodied thereon, the computer program comprising:
    computer code for determining whether there is a condition for which a plurality of threads are to be notified;
    if so, computer code for broadcasting a notification indicia to a plurality of processors, each processor corresponding to a thread of the plurality of threads;
    computer code for setting, in response to the notification indicia, a flag in at least one memory storage area corresponding to each of the plurality of processors wherein the setting the flag occurs without the intervention of an operating system;
    wherein if a cache manager is not configured to notify processor of the received notification indicia, the processor determining whether flag indicia is stored within cache manager after a selected number of cycles.

12. A processor for notifying a plurality of threads in a computer system, the processor including a computer program comprising:
    computer code for determining whether there is a condition for which the plurality of threads are to be notified;
    if so, computer code for broadcasting a notification indicia to a plurality of processors, each processor of the plurality of processor corresponding to a thread of the plurality of threads;
    computer code for setting, in response to the notification indicia, a flag in at least one memory storage area corresponding to each processor of the plurality of processors wherein the setting the flag occurs without the intervention of an operating system;
    wherein if a cache manager is not configured to notify processor of the received notification indicia, the processor determining whether flag indicia is stored within cache manager after a selected number of cycles.

* * * * *